(12) United States Patent
Kim et al.

(10) Patent No.: US 9,332,097 B2
(45) Date of Patent: May 3, 2016

(54) MOBILE TERMINAL

(75) Inventors: Moonpyeong Kim, Seoul (KR);
Jongwun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 13/494,413

(22) Filed: Jun. 12, 2012

(65) Prior Publication Data

US 2013/0033401 A1    Feb. 7, 2013

(30) Foreign Application Priority Data

Aug. 3, 2011   (KR) .......................... 10-2011-0077242

(51) Int. Cl.
*H01Q 1/24* (2006.01)
*H04M 1/03* (2006.01)
(52) U.S. Cl.
CPC ..................................... *H04M 1/035* (2013.01)
(58) Field of Classification Search
CPC ......... H01Q 1/24; H01Q 1/241; H01Q 1/242; H01Q 1/243; H01Q 1/22; H04M 1/035
USPC .................. 343/702, 720; 455/575.7
See application file for complete search history.

(56) References Cited

U.S. PATENT DOCUMENTS

| 7,136,625 | B2 * | 11/2006 | Ylitalo et al. ................. 455/90.3 |
| 7,301,764 | B2 * | 11/2007 | Chen .............................. 361/694 |
| 7,974,582 | B2 * | 7/2011  | Zhu et al. ..................... 455/63.1 |
| 2004/0253995 | A1 | 12/2004 | Matsumoto et al. ....... 455/569.1 |
| 2006/0083401 | A1 | 4/2006  | Go |
| 2007/0049326 | A1 | 3/2007  | Kim |
| 2007/0290945 | A1 | 12/2007 | Gold |

FOREIGN PATENT DOCUMENTS

CN            1921508 A      7/2007

OTHER PUBLICATIONS

Chinese Office Action issued in Application No. 201210270355.3 dated Sep. 10, 2014.

* cited by examiner

*Primary Examiner* — Michael C Wimer
(74) *Attorney, Agent, or Firm* — KED & Associates LLP

(57) ABSTRACT

A mobile terminal is disclosed. The mobile terminal may include a front case, a rear case installed to a rear of the front case, an antenna module provided to the rear of the front case, the antenna module including a first region provided at a first edge portion of the front case and a second region provided at a second edge portion of the front case and a speaker provided between the first region of the antenna module and the front case to output sound to a space between the antenna module and the front case.

14 Claims, 6 Drawing Sheets

MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2011-0077242, filed on Aug. 3, 2011, the contents of which are hereby incorporated by reference herein in their entirety.

BACKGROUND

1. Field

The present invention relates to a mobile terminal. Although the present invention is suitable for a wide scope of applications, it is particularly suitable for enhancing performance of a speaker module by extending a resonance space of the speaker module and slimming an overall thickness by making better use of a space.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which performance of a speaker module can be enhanced by means of extending a resonance space of the speaker module.

Another object of the present invention is to provide a mobile terminal, by which an overall thickness can be slimmed in a manner of making better use of a space.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may comprise a front case, a rear case installed to a rear of the front case, an antenna module provided to the rear of the front case, the antenna module including a first region provided at a first edge portion of the front case and a second region provided at a second edge portion of the front case and a speaker provided between the first region of the antenna module and the front case to output sound to a space between the antenna module and the front case.

Preferably, a height of a resonance space of the sound outputted from the speaker may be based on an interval between the antenna module and the front case.

Preferably, the antenna module may further include a perforating hole on the first region of the antenna module, and the speaker may be provided within the perforating hole on the first region of the antenna module.

Preferably, the resonance space may be provided between the second region of the antenna module and the front case.

Preferably, the rear case may be provided to a first portion of the rear of the front case without overlapping with the second region of the antenna module.

Preferably, the antenna module may be provided to a second portion of the rear of the front case.

Preferably, the mobile terminal may further comprises a bracket at the rear of the front case, the speaker may be provided on the bracket and a height of a resonance space of the sound outputted from the speaker may be based on distance between the antenna module and the bracket.

Preferably, the antenna module may include a perforating hole, and the speaker may be further provided within the perforating hole.

Preferably, the perforating hole may be provided to the first region of the antenna module, and the resonance space may be between the second region of the antenna module and the bracket.

Preferably, the rear case may be provided to a first portion of the rear of the front case without overlapping with the second region of the antenna module.

Preferably, the antenna module may be provided to a second portion of the rear of the front case.

In another aspect of the present invention, a mobile terminal may comprise a front case, a rear case to cover a first rear portion of the front case, an antenna module to cover a second rear portion of the front case, and a speaker provided between the antenna module and the front case such that the speaker is on the antenna module, and the speaker is configured to output sound to a space between the antenna module and the front case.

Preferably, the antenna module may include a first region provided at a first edge portion of the front case and a second region provided at a second edge portion of the front case, the antenna module may further include a perforating hole on the first region of the antenna module, and the speaker may be provided in the perforating hole of the first region of the antenna module.

Preferably, the speaker may output the sound between the second region of the antenna region and the front case.

Preferably, a height of a resonance space of the sound outputted from the speaker may be based on a distance between the second region of the antenna module and the front case.

Preferably, the mobile terminal may further comprise a bracket provided between the front case and the speaker to provide a mounting space for the speaker, and a height of a resonance space of the sound outputted from the speaker may be based on a distance between the second region of the antenna module and the bracket.

Preferably, the rear case and the antenna module may have a same height while installed in the mobile terminal.

In a further aspect of the present invention, a mobile terminal may comprise a front case, an antenna module to attach to the front case, wherein the antenna module includes a first region provided at a first edge portion of the front case and a second region provided at a second edge portion of the front case, a speaker provided within a volume space of the antenna module, and a rear case to attach to the front case. The speaker may output sound via the volume space of the antenna module.

Preferably, the antenna module may further include a perforating hole, and the speaker may be provided in the perforating hole.

Preferably, the rear case and the antenna module may have a same height while being provided in the mobile terminal.

Accordingly, the present invention provides the following effects and/or advantages.

First of all, a mobile terminal according to at least one embodiment of the present invention enhances performance of a speaker module by means of extending a resonance space of the speaker module.

Secondly, a mobile terminal according to at least one embodiment of the present invention makes better use of a space, thereby slimming overall thickness of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
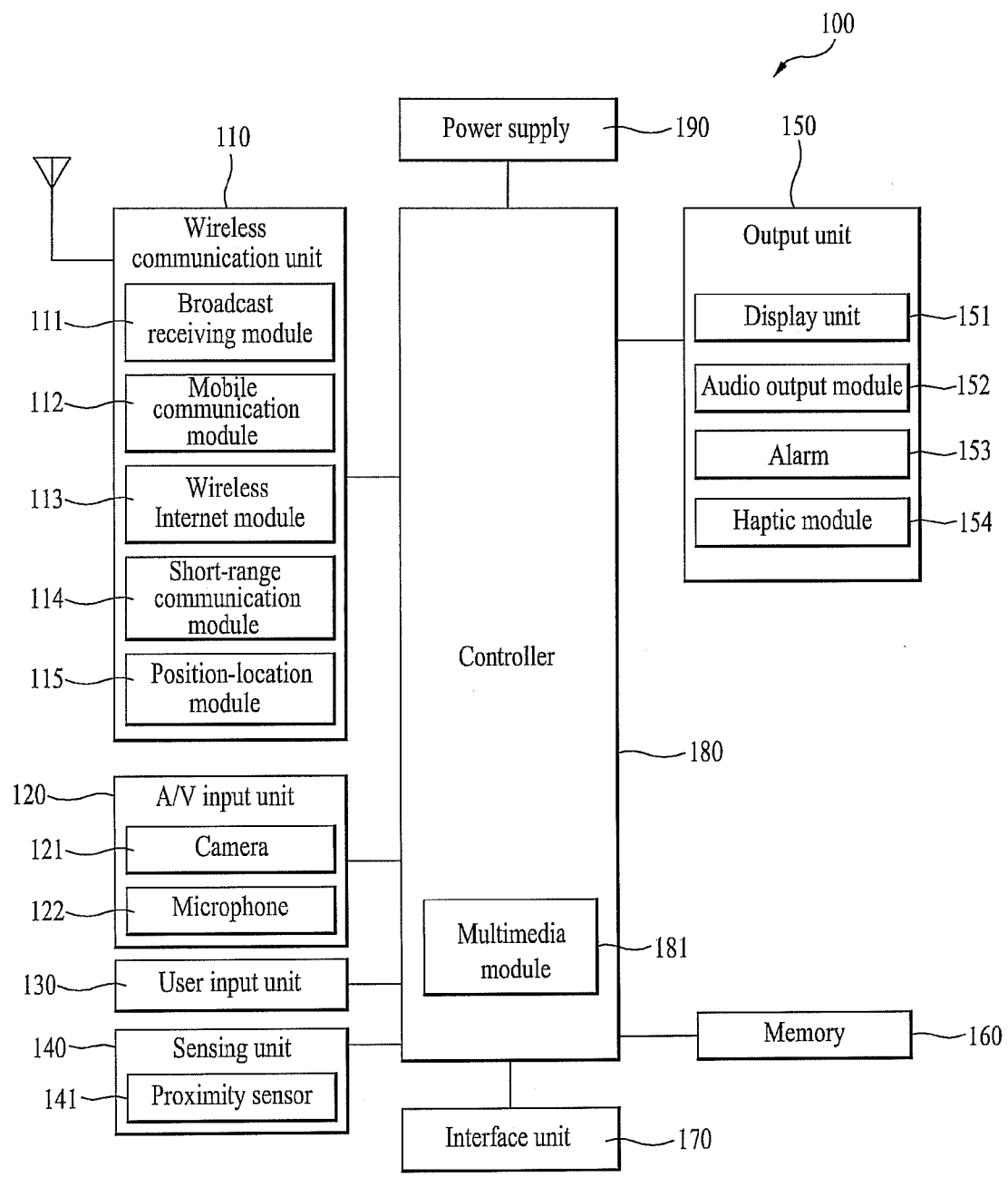
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
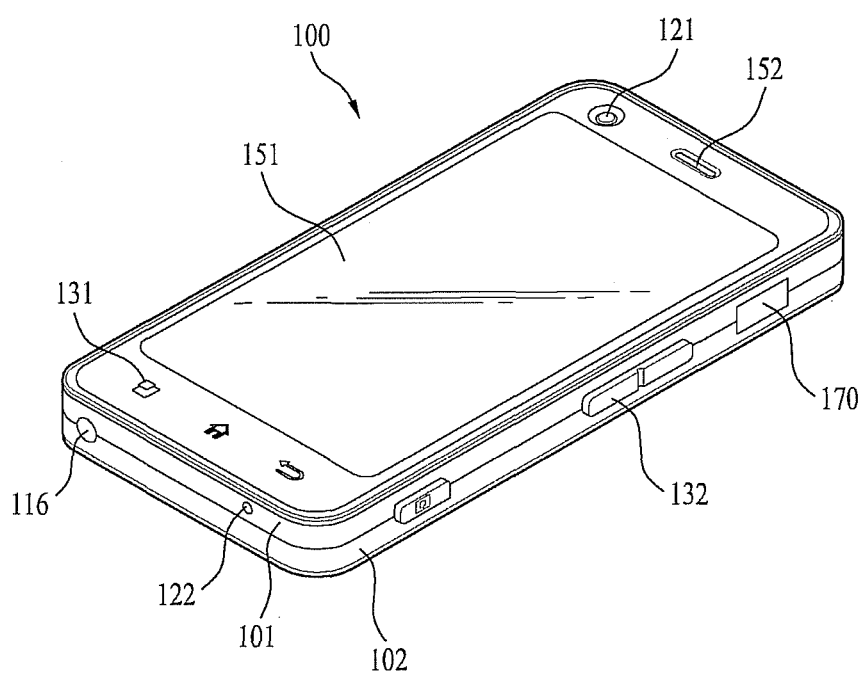
FIG. 2 is a front perspective diagram of a mobile terminal according to one embodiment of the present invention.

FIG. 2 is a front perspective diagram for one example of a mobile terminal 100 according to one embodiment of the present invention. And, FIG. 3 is a rear perspective diagram of the mobile terminal 100 according to one embodiment of the present invention.

Figure 3:
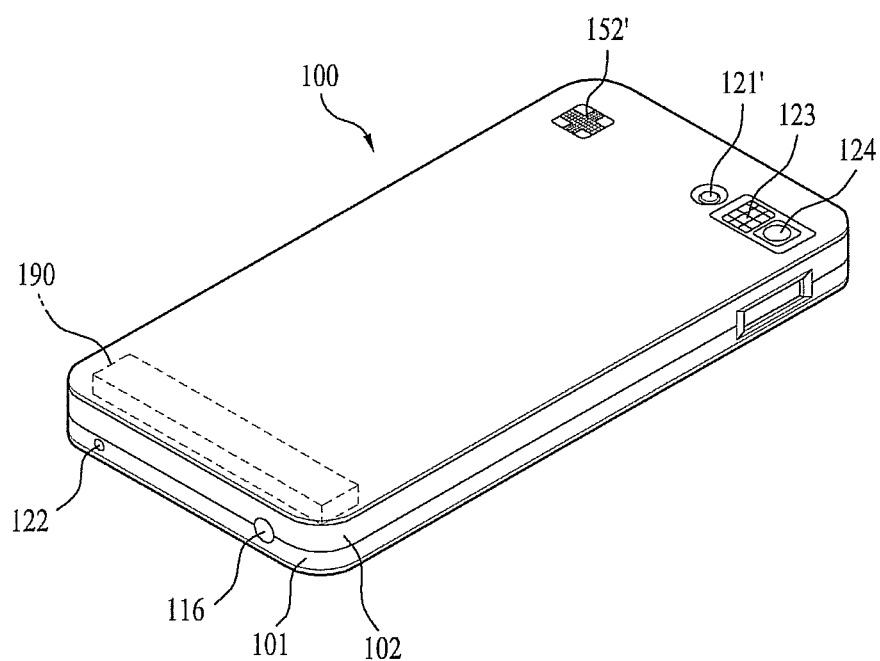
FIG. 3 is a rear perspective diagram of a mobile terminal according to one embodiment of the present invention.

Referring to FIG. 2 and FIG. 3, the mobile terminal 100 shown in the drawing has a terminal body of a bar type, by which the present invention may be non-limited. Moreover, the mobile terminal 100 may be implemented in a variety of different configurations. Examples of such configurations may include a slide type, a folder type, a swing type, a swivel type and the like, in which at least two bodies are assembled to enable relative motion.

The terminal body may include a case (e.g., a casing, a housing, a cover, etc.) configuring an exterior thereof. According to the present embodiment, the case may be divided into a front case 101 and a rear case 102. Various electric/electronic parts may be loaded in a space provided between the front and rear cases 101 and 102. Optionally, at least one middle case may be further provided between the front and rear cases 101 and 102.

The cases 101 and 102 may be formed by injection molding of synthetic resin or metal substance such as stainless steel (STS), titanium (Ti) and the like for example.

The cases 101 and 102 may be formed of combination of injection-molded synthetic resin and metal based material to provide a fancy exterior. For instance, the front case 101 is formed of synthetic resin by injection molding, while the rear case 102 is formed of metal based material. Alternatively, prescribed portions of the cases 101 and 102 are formed of injection-molded synthetic resin, while the rest of the cases 101 and 102 are formed of metal based material. In the following description, a region of the case formed of the metal based material may be named a deco region.

A display 151, an audio output unit 152, a camera 121, a user input unit 130 (131/132), a microphone 122, an interface 170 and the like may be provided to the terminal body, and mainly, to the front case 101.

The display 151 may occupy most of a main face of the front case 101. The audio output unit 151 and the camera 121 may be provided to an area adjacent to one of both end portions of the display 151, while the user input unit 131 and the microphone 122 may be provided to another area adjacent to the other end portion of the display 151. The user input unit 132, the interface 170 and the like may be provided to lateral sides of the front and rear cases 101 and 102.

The user input unit 130 may be manipulated to receive an input of a command for controlling an operation of the terminal 100. And, the input unit 130 may be able to include a plurality of manipulating units 131 and 132. The manipulating units 131 and 132 may be generally named a manipulating portion and may adopt any mechanism of a tactile manner that enables a user to perform a manipulating action by experiencing a tactile feeling.

Contents inputted by the manipulating units 131 and 132 may be set in various ways. For instance, such a command as start, end, scroll and the like may be inputted to the first manipulating unit 131. And, a command for a volume adjustment of sound outputted from the audio output unit 152, a command for a switching to a touch recognizing mode of the display 151 or the like may be inputted to the second manipulating unit 132.

Referring to FIG. 3, a camera 121' may be additionally provided to a backside of the terminal body, and more particularly, to the rear case 102. The camera 121' has a photographing direction that is substantially opposite to that of the former camera 121 shown in FIG. 2 and may have pixels differing from those of the former camera 121.

For instance, the former camera 121 mounted on the front case 101 may have low pixels enough to take and transmit a picture of user's face for a video call, while the latter camera 121' mounted on the rear case 102 may have high pixels for capturing a general subject for photography without transmitting the captured subject. And, each of the cameras 121 and 121' may be installed at the terminal body to be rotatable or popped up.

A flash (not shown in the drawing) and a mirror (not shown in the drawing) may be additionally provided adjacent to the camera 121'. The flash projects light toward a subject in case of taking a picture of the subject using the camera 121'. In case that a user attempts to take a picture of the user (self-photographing) using the camera 121', the mirror enables the user to view user's face reflected by the mirror 124.

A broadcast signal receiving antenna 124 may be additionally provided to the lateral side of the terminal body as well as an antenna for communication or the like. The antenna 124 constructing a portion of the broadcast receiving module (indicated by the reference number '111' in FIG. 1) may be retractably provided to the terminal body.

A power supply unit 190 (cf. FIG. 1) for supplying a power to the mobile terminal 100 may be provided to the terminal body. And, the power supply unit 190 may be configured to be built within the terminal body. Alternatively, the power supply unit 190 may be configured to be detachably connected to the terminal body. At least one portion of the power supply unit 190 may be provided within the rear case 102.

A cover member 103 may be detachably installed to the terminal body to enclose the power supply unit 103 and at least one portion of the rear case 102. While the cover member 103 is removed from the terminal body, a user may be able to detach the power supply unit 190 from the terminal body.

Figure 4:
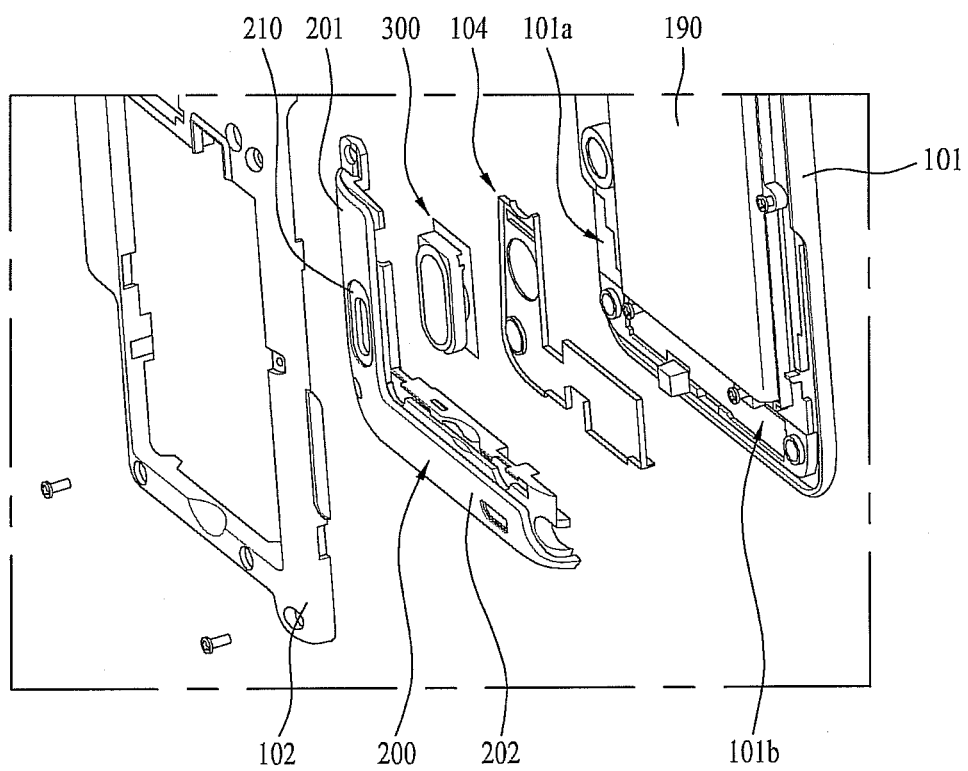
FIG. 4 and FIG. 5 are exploded perspective diagrams of a mobile terminal according to one embodiment of the present invention.
Figure 5:
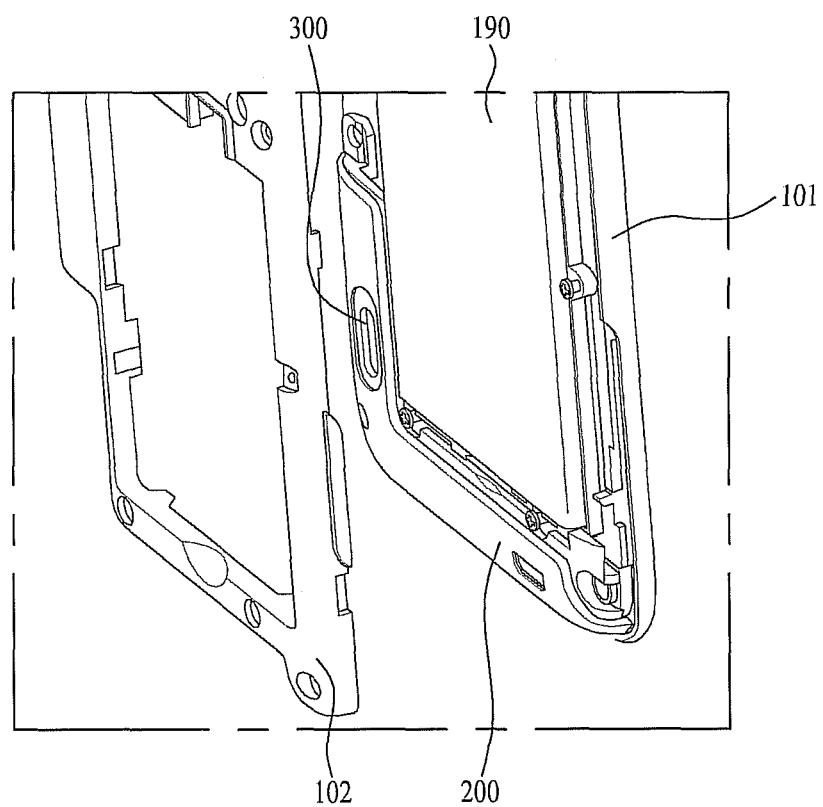
Figure 6:
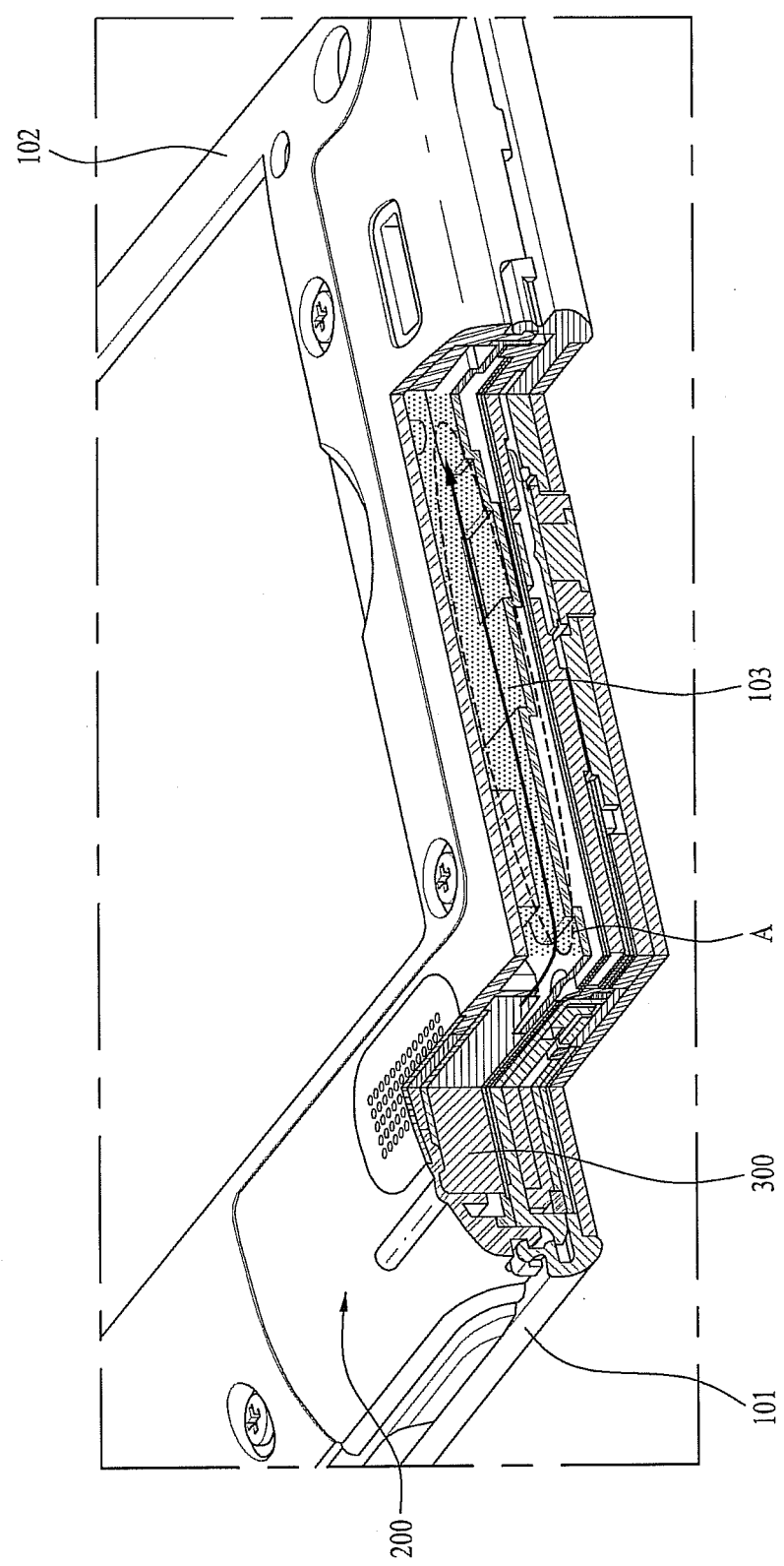
FIG. 6 is a perspective diagram of a mobile terminal having a prescribed portion cut out according to one embodiment of the present invention.

FIG. 3 is a rear perspective diagram of a mobile terminal according to one embodiment of the present invention. FIG. 4 and FIG. 5 are exploded perspective diagrams of a mobile terminal according to one embodiment of the present invention. And, FIG. 6 is a perspective diagram of a mobile terminal having a prescribed portion cut out according to one embodiment of the present invention.

A mobile terminal 100 according to one embodiment of the present invention may include a front case 101, a rear case 102 installed at the front case 101, an antenna module 200 provided in rear of the front case 101, and a speaker 300 provided between the antenna module 200 and the front case 101 to output sound to a space between the antenna module 200 and the front case 101.

And, a mobile terminal 100 according to one embodiment of the present invention may include a front case 101, a rear case 102 enclosing a prescribed portion of the front case 101, an antenna module 200 enclosing the rest portion of the front case 101, and a speaker 300 provided between the antenna module 200 and the front case 101 in a manner of being superposed on the antenna module 200, the speaker 300 configured to output sound to a space between the antenna module 200 and the front case 101.

Moreover, a mobile terminal 100 according to one embodiment of the present invention may include a front case 101, an antenna module 200 installed at the front case 101, a speaker 300 provided within a volume space of the antenna module 200, and a rear case 102 installed at the front case 101 not to be superposed on each of the speaker 200 and the antenna module 200. In this case, the speaker 300 outputs sound via the volume space of the antenna module 200.

In particular, a height of a resonance space of the sound outputted from the speaker 300 may be determined as an interval between the antenna module 200 and the front case 101.

Meanwhile, in order to raise performance of the speaker 200, it may be necessary to secure a sufficient resonance space. As mentioned in the foregoing description, various components including the display 150, the controller 180, the power supply unit 190 and the like are mounted on the terminal body. In order to slim the terminal body, the respective components need to be stacked or superposed on each other. Therefore, in order to enhance the performance of the speaker, it may be important to secure a sufficient resonance space.

The speaker 300 may be able to use the volume space of the antenna module 200 as a resonance space.

In the following description, an installation structure of the speaker 300 to secure a sufficient resonance space is explained in detail with reference to the accompanying drawings.

First of all, the antenna module 200 may include an insulating carrier and a conductive pattern provided on the insulating carrier. In this case, the insulating carrier may be formed of injection-molded resin and may play a role as a structure for supporting the conductive pattern. In particular, the insulating carrier may have one of various configurations or shapes, and more particularly, a shape in which a prescribed space portion is provided toward the front case 101.

The antenna module 200 has a perforating hole 210, at least one portion of the speaker 300 may be installed within the perforating hole 210, and the antenna module 200 and the speaker 300 are installed at the terminal body in a manner of being superpose on each other in part at least. Hence, it may be able to reduce an overall thickness.

The antenna module 200 may include a first region 201 and a second region 202 provided to a first edge portion 101a of a backside of the front case 101 and a second edge portion 101b adjacent to the first edge portion 101a, respectively. For example, the antenna module 200 may be substantially shaped as 'L'.

In this case, the perforating hole 210 may be provided to the first region 201 of the antenna module 200 and a resonance space A may be provided between the second region 202 and the front case 101. Moreover, as mentioned in the foregoing description, the resonance space A may be determined as a shape of the insulating carrier of the antenna module 200.

As mentioned in the above description, the mobile terminal 100 according to one embodiment of the present invention may be able to utilize at least one portion of the volume space of the antenna module 300 as the resonance space A of the speaker 300, thereby enhancing the performance of the speaker 300 with the reduced thickness of the terminal body.

Meanwhile, the rear case 102 may be provided to a prescribed region of the backside of the front case 101 not to overlap with the second region 202 of the antenna module 200.

In particular, in case that a prescribed region of the rear case 102 overlaps with the resonance space A provided between the antenna module 200 and the front case 101, the height of the resonance space A eventually decreases by the thickness of the rear case 102 to lower the performance of the speaker 300.

Hence, the rear case 102 may be configured not to interfere with the antenna module 200 installed at the front case 101. In particular, the rear case 102 may be installed in a manner that the power supply unit 190 is received in the prescribed region of the backside of the front case 101, while the antenna module 200 is installed at the rest region of the backside of the front case 101 in a manner of receiving a prescribed portion of the speaker 300 inside.

Namely, in view of the backside of the front case 101, the rear case 102 does not overlap with the antenna module 200 and may be installed not to be superposed on the speaker 300.

Each of the rear case 102 and the antenna module 200 may have the same height while installed at the front case 101. Owing to this configuration, each outer circumference of the rear case 102 and the antenna module 200 may have the same shape of a single case. Therefore, the cover member for enclosing the power supply unit 190 can be installed as a normal cover member.

Meanwhile, the speaker 300 may be installed at one end portion (not shown in the drawing) of the rear case 102 to output sound to the space between the antenna module 200 and the front case 101. In this case, a perforating hole is provided to the one end portion of the rear case 102 and a prescribed portion of the speaker 300 may be received within the perforating hole.

The mobile terminal 100 according to one embodiment of the present invention may include a bracket 103 installed at the backside of the front case 101 to have the speaker 300 mounted thereon.

In this case, the height of the resonance space A for the sound outputted from the speaker 300 may be determined as an interval between the antenna module 200 and the bracket 103. The height of the resonance space A may be maintained constant along the sound outputted direction via the bracket 103.

In this case, the antenna module 200 has a perforating hole 210 and at least one portion of the speaker 300 may be provided within the perforating hole 210 by being mounted on the bracket 103, and the antenna module 200 and the speaker 300 are installed at the terminal body in a manner of being superposed on each other in part at least. Therefore, it may be able to reduce an overall thickness of ht4e terminal body.

Meanwhile, the antenna module 200 may include a first region 201 and a second region 202 provided to a first edge portion 101a of a backside of the front case 101 and a second edge portion 101b adjacent to the first edge portion 101a, respectively. For example, the antenna module 200 may be substantially shaped as 'L' and the bracket 103 may have a shape corresponding to the shape of the antenna module 200.

In this case, a perforating hole 210 may be provided to the first region 201 of the antenna module 200 and a resonance space A may be provided between the second region 202 and the bracket 103.

As mentioned in the above description, the mobile terminal 100 according to one embodiment of the present invention may be able to utilize at least one portion of the volume space of the antenna module 300 as the resonance space A of the speaker 300, thereby enhancing the performance of the speaker 300 with the reduced thickness of the terminal body.

Meanwhile, the rear case 102 may be provided to a prescribed region of the backside of the front case 101 not to overlap with the second region 202 of the antenna module 200.

In particular, in case that a prescribed region of the rear case 102 overlaps with the resonance space A provided between the antenna module 200 and the bracket 103, the height of the resonance space A eventually decreases by the thickness of the rear case 102 to lower the performance of the speaker 300.

Hence, the rear case 102 may be configured not to interfere with the antenna module 200 installed at the front case 101. In particular, the rear case 102 may be installed in a manner that the power supply unit 190 is received in the prescribed region of the backside of the front case 101, while the antenna module 200 is installed at the rest region of the backside of the front case 101 in a manner of receiving a prescribed portion of the speaker 300 inside.

To achieve these objects and other advantages and in accordance with the purpose of the disclosure, as embodied and broadly described herein, a mobile terminal may comprise a front case, a rear case installed to a rear of the front case, an antenna module provided to the rear of the front case, the antenna module including a first region provided at a first edge portion of the front case and a second region provided at a second edge portion of the front case and a speaker provided between the first region of the antenna module and the front case to output sound to a space between the antenna module and the front case.

In one embodiment as broadly described herein, a height of a resonance space of the sound outputted from the speaker may be based on an interval between the antenna module and the front case. The antenna module may further include a perforating hole on the first region of the antenna module, and the speaker may be provided within the perforating hole on the first region of the antenna module.

The resonance space may be provided between the second region of the antenna module and the front case. The rear case may be provided to a first portion of the rear of the front case without overlapping with the second region of the antenna module. The antenna module may be provided to a second portion of the rear of the front case.

The mobile terminal may further comprises a bracket at the rear of the front case, the speaker may be provided on the bracket and a height of a resonance space of the sound outputted from the speaker may be based on distance between the antenna module and the bracket.

The antenna module may include a perforating hole, and the speaker may be further provided within the perforating hole. The perforating hole may be provided to the first region of the antenna module, and the resonance space may be between the second region of the antenna module and the bracket. The rear case may be provided to a first portion of the rear of the front case without overlapping with the second region of the antenna module. The antenna module may be provided to a second portion of the rear of the front case.

In one embodiment as broadly described herein, a mobile terminal may comprise a front case, a rear case to cover a first rear portion of the front case, an antenna module to cover a second rear portion of the front case, and a speaker provided between the antenna module and the front case such that the speaker is on the antenna module, and the speaker is configured to output sound to a space between the antenna module and the front case.

The antenna module may include a first region provided at a first edge portion of the front case and a second region provided at a second edge portion of the front case, the antenna module may further include a perforating hole on the first region of the antenna module, and the speaker may be provided in the perforating hole of the first region of the antenna module.

The speaker may output the sound between the second region of the antenna region and the front case. A height of a resonance space of the sound outputted from the speaker may be based on a distance between the second region of the antenna module and the front case.

The mobile terminal may further comprise a bracket provided between the front case and the speaker to provide a mounting space for the speaker, and a height of a resonance space of the sound outputted from the speaker may be based on a distance between the second region of the antenna module and the bracket. The rear case and the antenna module may have a same height while installed in the mobile terminal.

In another aspect of the present invention, a mobile terminal may comprise a front case, an antenna module to attach to the front case, wherein the antenna module includes a first region provided at a first edge portion of the front case and a second region provided at a second edge portion of the front case, a speaker provided within a volume space of the antenna module, and a rear case to attach to the front case. The speaker may output sound via the volume space of the antenna module.

The antenna module may further include a perforating hole, and the speaker may be provided in the perforating hole. The rear case and the antenna module may have a same height while being provided in the mobile terminal.

As mentioned in the foregoing description, a mobile terminal according to at least one embodiment of the present invention enhances performance of a speaker module by means of extending a resonance space of the speaker module. And, a mobile terminal according to at least one embodiment of the present invention makes better use of a space, thereby slimming overall thickness of the mobile terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a front case;
    a rear case installed to a rear of the front case;
    an antenna module provided to the rear of the front case, the antenna module including a first region provided at a first edge portion of the front case and a second region provided at a second edge portion of the front case;
    a speaker provided between the first region of the antenna module and the front case to output sound between the antenna module and the front case, wherein the speaker is provided in a resonance space of sound between the antenna module and the front case; and
    a bracket at a rear of the front case, wherein the speaker is mounted on the bracket,
    wherein the antenna module further includes a perforating hole at the first region of the antenna module, wherein the perforating hole is exposed to external of the mobile terminal, wherein the speaker is provided within the perforating hole by being mounted on the bracket, wherein a front face of the speaker is exposed to external of the perforating hole,
    wherein the resonance space of sound is configured to be a closed space by the antenna module, the front case and the speaker, and wherein the rear case is provided to a first portion of the rear of the front case without overlapping with the second region of the antenna module.

2. The mobile terminal of claim 1, wherein the resonance space is provided between the second region of the antenna module and the front case.

3. The mobile terminal of claim 2, wherein the antenna module is provided to a second portion of the rear of the front case.

4. The mobile terminal of claim 1, wherein a height of a resonance space of the sound outputted from the speaker is based on distance between the antenna module and the bracket.

5. The mobile terminal of claim 4, wherein the resonance space is between the second region of the antenna module and the bracket.

6. The mobile terminal of claim 5, wherein the antenna module is provided to a second portion of the rear of the front case.

7. A mobile terminal, comprising:
a front case;
a rear case to cover a first rear portion of the front case;
an antenna module to cover a second rear portion of the front case; and
a speaker provided in a resonance space of sound between the antenna module and the front case such that the speaker is under the antenna module, and the speaker is configured to output sound,
a bracket at a rear of the front case, wherein the speaker is mounted on the bracket,
wherein the antenna module includes a perforating hole on the antenna module, wherein a front face of the speaker is exposed to external of the perforating hole, wherein the speaker is provided within the perforating hole by being mounted on the bracket, and wherein the rear case is provided to a first portion of the rear of the front case without overlapping with the antenna module, and wherein the resonance space of sound is configured to be a closed space by the antenna module, the front case and the speaker.

8. The mobile terminal of claim 7, wherein the antenna module includes a first region provided at a first edge portion of the front case and a second region provided at a second edge portion of the front case, and wherein the perforating hole is provided on the first region of the antenna module.

9. The mobile terminal of claim 8, wherein the speaker outputs the sound between the second region of the antenna region and the front case.

10. The mobile terminal of claim 9, wherein a height of a resonance space of the sound outputted from the speaker is based on a distance between the second region of the antenna module and the front case.

11. The mobile terminal of claim 8, wherein the bracket is provided between the front case and the speaker to provide a mounting space for the speaker, wherein a height of the resonance space of the sound outputted from the speaker is based on a distance between the second region of the antenna module and the bracket.

12. The mobile terminal of claim 7, wherein the rear case and the antenna module have a same height while installed in the mobile terminal.

13. A mobile terminal, comprising:
a front case;
an antenna module to attach to the front case, wherein the antenna module includes a first region provided at a first edge portion of the front case and a second region provided at a second edge portion of the front case;
a speaker provided within a volume space of the antenna module;
a rear case to attach to the front case; and
a bracket at a rear of the front case wherein the speaker is mounted on the bracket,
wherein the speaker outputs sound via the volume space of the antenna module,
wherein the speaker is provided in a resonance space of sound between the antenna module and the front case,
wherein the antenna module further includes a perforating hole on the first region of the antenna module, the perforating hole is exposed to external of the mobile terminal,
wherein a front face of the speaker is exposed to external of the perforating hole, and the speaker is provided within the perforating hole by being mounted on the bracket,
wherein the resonance space of sound is configured to be a closed space by the antenna module, the front case and the speaker, and
wherein the rear case is provided to a first portion of the rear of the front case without overlapping with the second region of the antenna module.

14. The mobile terminal of claim 13, wherein the rear case and the antenna module have a same height while being provided in the mobile terminal.

* * * * *